United States Patent
Tiwari et al.

(10) Patent No.: US 9,332,552 B2
(45) Date of Patent: May 3, 2016

(54) FREQUENCY AGILITY FOR WIRELESS EMBEDDED SYSTEMS

(75) Inventors: Ankit Tiwari, Sturbridge, MA (US);
Richard Gonchar, Burlington, CT (US);
Luiz Fernando Huet de Bacellar, Glastonbury, CT (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 362 days.

(21) Appl. No.: 13/816,784

(22) PCT Filed: Aug. 25, 2010

(86) PCT No.: PCT/US2010/046622
§ 371 (c)(1),
(2), (4) Date: Feb. 13, 2013

(87) PCT Pub. No.: WO2012/026930
PCT Pub. Date: Mar. 1, 2012

(65) Prior Publication Data
US 2013/0142074 A1    Jun. 6, 2013

(51) Int. Cl.
*H04W 72/08* (2009.01)
*H04W 72/06* (2009.01)
(Continued)

(52) U.S. Cl.
CPC .......... *H04W 72/082* (2013.01); *H04L 1/1867* (2013.01); *H04L 1/24* (2013.01); *H04W 72/06* (2013.01)

(58) Field of Classification Search
CPC ... H04W 72/08; H04W 72/082; H04W 72/06; H04W 72/0406; H04W 72/085; H04W 72/02; H04W 16/14; H04W 28/04; H04W 88/08; H04W 24/00; H04W 84/12; H04W 84/10; H04W 48/08; H04L 1/24; H04L 1/1667; H04L 12/24; H04L 12/28; H04L 69/32; H04B 1/715; H04B 1/7143; H04B 2001/7154
USPC ................ 370/252, 225, 248, 242, 332, 437; 375/131, 132, 138
See application file for complete search history.

(56) References Cited

U.S. PATENT DOCUMENTS

2003/0002456 A1\* 1/2003 Soomro ................. H04W 72/02
370/328
2004/0037247 A1\* 2/2004 Ngo ....................... H04W 72/08
370/332

(Continued)

OTHER PUBLICATIONS

International Search Report mailed May 24, 2011 for International Application No. PCT/US2010/046622 filed Aug. 25, 2010, 5 pages.

(Continued)

*Primary Examiner* — Andrew Chriss
*Assistant Examiner* — Rasha Fayed
(74) *Attorney, Agent, or Firm* — Cantor Colburn LLP (57) ABSTRACT

A method for frequency agility in a wireless embedded system, the wireless embedded system comprising a WAP and a WEP communicating on a current channel, includes determining a first channel table comprising an order of available channels for the WAP; determining a second channel table for WEP, wherein the first channel table and the second channel table list the available channels in the same order; in the event interference is detected by the WAP on the current channel, determining a new current channel by testing the available channels for interference in the order listed in the first channel table; and in the event the WEP does not receive an acknowledgement from the WAP of a message sent by the WEP to the WAP, resending the message on each of the available channels in the order listed in the second channel table until an acknowledgement is received from the WAP.

15 Claims, 5 Drawing Sheets

(51) Int. Cl.
*H04L 1/18* (2006.01)
*H04L 1/24* (2006.01)

(56) References Cited

U.S. PATENT DOCUMENTS

| | | | | |
|---|---|---|---|---|
| 2004/0156336 | A1* | 8/2004 | McFarland | H04L 1/22 370/329 |
| 2005/0245269 | A1* | 11/2005 | Demirhan | H04W 24/00 455/452.1 |
| 2006/0171335 | A1* | 8/2006 | Yuen | H04W 36/06 370/255 |
| 2007/0060158 | A1* | 3/2007 | Medepalli | H04W 72/085 455/450 |
| 2007/0076596 | A1* | 4/2007 | Roy | H04W 36/06 370/228 |
| 2007/0117517 | A1* | 5/2007 | Hui | H04W 72/085 455/67.11 |
| 2008/0220786 | A1* | 9/2008 | Beacham | H04W 72/085 455/450 |
| 2011/0149759 | A1* | 6/2011 | Jollota | A61B 5/0024 370/252 |
| 2011/0255570 | A1* | 10/2011 | Fujiwara | H04B 1/7143 375/133 |

OTHER PUBLICATIONS

Written Opinion mailed May 24, 2011 for International Application No. PCT/US2010/046622 filed Aug. 25, 2010, 3 pages.
Chinese First Office Action dated Feb. 2, 2015 for Application No. 201080069110.3 Filing Date: Aug. 25, 2010; Part 1: pp. 1-5; Part 2: pp. 1-11.
Chinese Search Report dated Jan. 27, 2015 for Application No. 2010800691103; Filing Date: Aug. 25, 2010; pp. 1-3.

* cited by examiner

FREQUENCY AGILITY FOR WIRELESS EMBEDDED SYSTEMS

CROSS-REFERENCE TO RELATED APPLICATION

This is a U.S. national stage of application No. PCT/US2010/046622, filed on 25 Aug. 2010. Priority under 35 U.S.C. §119(a) and 35 U.S.C. §365(b) is claimed and all the benefits accruing therefrom, the contents of which in its entirety are herein incorporated by reference.

BACKGROUND

The subject matter disclosed herein relates generally to the field of interference mitigation in wireless embedded systems.

Short-range wireless networks operate in a license-free frequency band, which may vary by geographical region. For example, in the United States, the 902 MHz to 928 MHz frequency band is part of the unlicensed industrial, scientific, and medical (ISM) band designated by the federal communications commission (FCC). This band is occupied by a wide variety of wireless devices, such as cordless phones, wireless meter reading system, home automation systems, etc. Because wireless embedded systems transmit signals with relatively low power to conserve battery life, interference between multiple radiofrequency (RF) sources may cause unreliable operation of wireless embedded systems.

Spread spectrum techniques including frequency hopping and direct sequence spread spectrum, may be employed at the transceiver hardware level to enhance the robustness of network against interference from outside signal sources. However, non-random, continuous or periodic interference from other wireless devices operating in a slice of the same frequency band may yield deteriorated performance in channels that overlap with interfering sources. Moreover, using frequency hopping and direct sequence spread spectrum can be energy-intensive and therefore not always practical for battery operated wireless devices. Other methods of overcoming interference include forming a hierarchical branching tree of wireless devices forming a network, transmitting beacons on all available channels, periodically determining and exchanging RF characteristics at all individual nodes. However, such methods require transmission and reception of messages on different channels in a timed sequence, requiring implementation of sophisticated time synchronization algorithms, and may still have situations where some devices may fall out-of-sync and never recover.

SUMMARY

According to one aspect of the invention, a method for frequency agility in a wireless embedded system, the wireless embedded system comprising a wireless access point (WAP) and a wireless end point (WEP) communicating on a current channel includes determining a first channel table comprising an order of available channels for the WAP; determining a second channel table for WEP, wherein the first channel table and the second channel table list the available channels in the same order; in the event interference is detected by the WAP on the current channel, determining a new current channel by testing the available channels for interference in the order listed in the first channel table; and in the event the WEP does not receive an acknowledgement from the WAP of a message sent by the WEP to the WAP, resending the message on each of the available channels in the order listed in the second channel table until an acknowledgement is received from the WAP, wherein resending the message on the available channels in the order listed in the second channel table is performed one or more times.

According to another aspect of the invention, a computer program product comprising a computer readable storage medium containing computer code that, when executed by a computer, implements a method for frequency agility in a wireless embedded system, the wireless embedded system comprising a wireless access point (WAP) and a wireless end point (WEP) communicating on a current channel, wherein the method includes determining a first channel table comprising an order of available channels for the WAP; determining a second channel table for WEP, wherein the first channel table and the second channel table list the available channels in the same order; in the event interference is detected by the WAP on the current channel, determining a new current channel by testing the available channels for interference in the order listed in the first channel table; and in the event the WEP does not receive an acknowledgement from the WAP of a message sent by the WEP to the WAP, resending the message on each of the available channels in the order listed in the second channel table until an acknowledgement is received from the WAP, wherein resending the message on the available channels in the order listed in the second channel table is performed one or more times.

According to another aspect of the invention, a wireless embedded system includes a wireless access point (WAP) configured to determine a first channel table comprising an order of available channels; a wireless end point (WEP) configured to determine a second channel table, wherein the first channel table and the second channel table list the available channels in the same order; wherein the WAP is further configured to, in the event interference is detected by the WAP on a current channel, determine a new current channel by testing the available channels for interference in the order listed in the first channel table; and wherein the WEP is further configured to, in the event the WEP does not receive an acknowledgement from the WAP of a message sent by the WEP to the WAP, resend the message on each of the available channels in the order listed in the second channel table until an acknowledgement is received from the WAP, wherein resending the message on the available channels in the order listed in the second channel table is performed one or more times.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for frequency agility for wireless embedded systems are provided, with exemplary embodiments being discussed below in detail. Users who have had bad experiences due to co-existence and interference issues between wireless devices may be wary of relying on a wireless embedded system for applications such as safety or security systems. Hence it is important to develop means to avoid interference from other wireless devices co-existing in the operating frequency band. Frequency agility mitigates interference between wireless devices operating in the same physical vicinity, allowing a wireless embedded system to co-exist with other wireless devices. Interference from both the internal and the external RF devices may be prevented, facilitating interference-free wireless network operation even while co-existing with other wireless systems. Operation of adjacent wireless clusters on different frequency channels may be ensured, thereby increasing the available bandwidth for each cluster. Channel migration may be achieved at both a wireless access point (WAP) and wireless end point (WEP) without losing messages, without any of the WEPs going out-of-sync with their associated WAP. The wireless embedded system may comprise a security or safety system in some embodiments An operating channel plan, or channel table, may be defined for devices in a single wireless cluster, listing multiple low bandwidth operating channels within the operating frequency band of the wireless system. Channel migration time is reduced in the WEPs by employing a channel table in the WAPs and WEPs that lists the available channels in the same order. Reduction of channel migration time may provide significant extension of WEP battery life. In some embodiments, the channel table may be created by the WAP, and then transmitted to the WEPs in the WAP's cluster. In other embodiments, the WAP may receive the channel table as part of an initial configuration (for example, from a computer based configuration utility), or use a default channel table stored in the WAP's local memory. The WEPs may also receive the channel table as part of an initial configuration (for example, from a computer based configuration utility), or use a default channel table stored in the WEPs' local memory.

Figure 1:
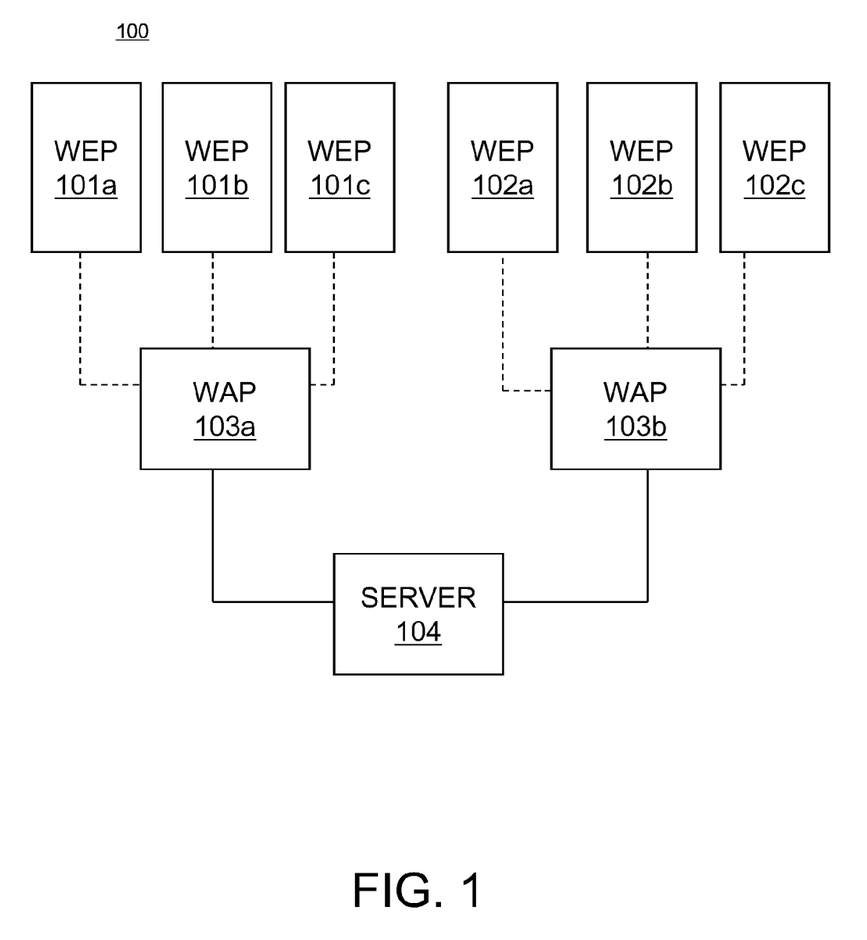
FIG. 1 illustrates an embodiment of a wireless embedded system.

FIG. 1 illustrates an embodiment of a wireless embedded system 100 comprising WEPs 101a-c and 102a-c. WEPs 101a-c and 102a-c are in wireless communication with WAPs 103a and 103b, respectively. WEPs 101a-c and WAP 103a form a first wireless cluster, and WEPs 102a-c and WAP 103b form a second wireless cluster. The first wireless cluster and the second wireless cluster may operate on different channels. WAPs 103a-b are in communication with server 104. WEPs 101a-c and 102a-c may be battery powered in some embodiments, and WAPs 103a-b may be line powered in some embodiments. WEPs 101a-c and 102a-c and WAPs 103a-b are shown for illustrative purposes only; a wireless embedded system may comprise any appropriate number of WAPs, which may be in communication with any appropriate number of WEPs. System 100 may coexist with any number and type of other wireless devices (not shown)

Figure 2:
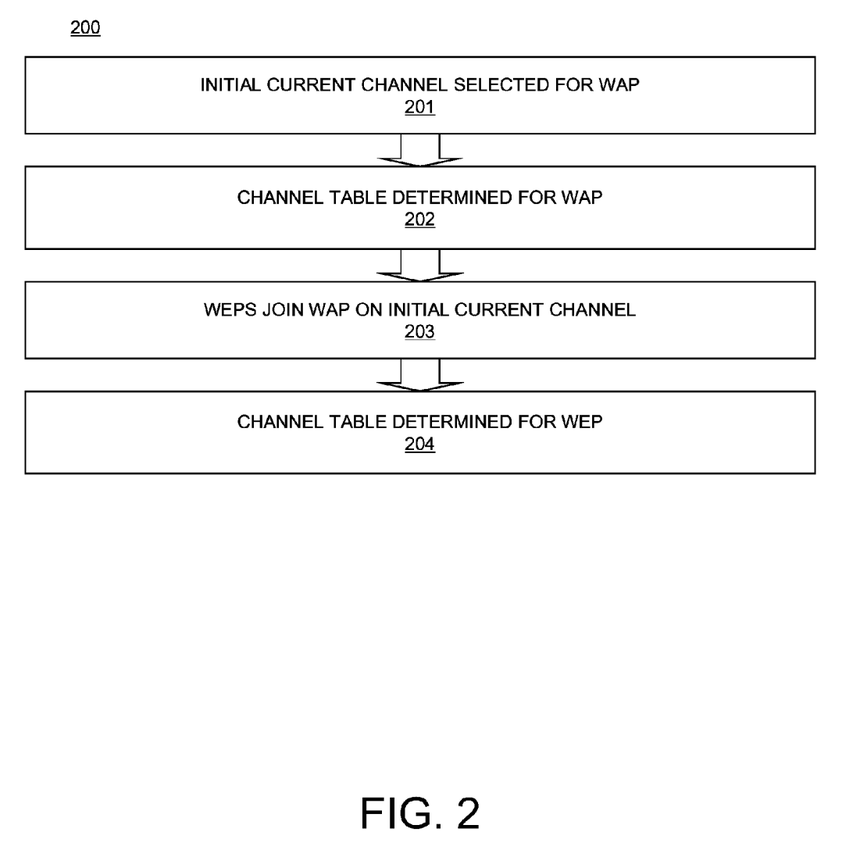
FIG. 2 illustrates an embodiment of a method for cluster formation.

The WAPs 103a-b form wireless clusters 101a-c and 102a-c by choosing an initial current channel for their respective clusters at startup. An embodiment of a cluster formation method 200 for a wireless cluster is illustrated in FIG. 2. First, in block 201, an initial current channel for WAP 103a is selected. The WAP 103a may scan all available channels for RF interference. RF interference may be from devices external to the wireless embedded system 100, or devices internal to the system 100. To detect interference from an external device, the WAP 103a measures the level of RF energy on every channel. To detect internal interference from another WAP (for example, WAP 103b), the WAP 103a sends out a polling message on every channel to see if there are other WAPs present on any of the channels, and may also listen for messages transmitted to or from other WAPs on every channel. The WAP 103a may choose the channel having the lowest RF interference during the scan as the initial current channel. Alternately, the initial current channel may be assigned to a WAP 103a by an administrator or system installer in some embodiments. In block 202, the channel table for the WAP 103a is determined. In some embodiments, the WAP 103a may create a channel table based on the results of the scan, in which the channels are ranked from least to most detected interference. Alternatively, in some embodiments, the WAP 103a may receive the channel table as part of its initial configuration (for example, from a computer based configuration utility), or use a default channel table stored in the WAP local memory. The channel table determines the order in which channels are migrated if interference is detected. In block 203, WEPs are enabled to join the WAP 103a, for example, WEP 101a. WEP 101a locates WAP 103a and its initial current channel by sending a join request message for the WAP 103a on every channel. A join confirmation is then received by the WEP 101a from a WAP 103a in response to the join message on initial current channel of the WAP 103a. The WEP 101a locks the channel on which the join confirmation is received as its initial current channel. In block 204, the channel table for WEP 101a is determined. The channel table for WEP 101a lists the available channels in the same order as the channel table for WAP 103a, so that the WAP 103a and the WEP 101a may both migrate channels in the same order if interference is detected (discussed below with respect to FIGS. 3 and 4). The channel table may be sent by WAP 103a to the WEP 101a in some embodiments. Alternatively, in some embodiments, the WEP 101a may receive the channel table as part of its initial configuration (for example, from a computer based configuration utility), or use a default channel table stored in the WEP local memory. FIG. 2 is discussed with respect to WAP 103a and WEP 101a for illustrative purposes only; the method of FIG. 2 may be implemented between any WAP or WEP. Once a WAP and one or more associated WEPs have locked an initial current channel to form a wireless cluster, the WAP and WEPs use the initial current channel for transmitting and receiving messages. If interference is detected on the initial current channel, a cluster comprising a WAP and one or more WEPs may migrate from their initial current channel another channel; the channel on which a cluster is transmitting and receiving messages during operation is hereinafter referred to as the current channel.

Figure 3:
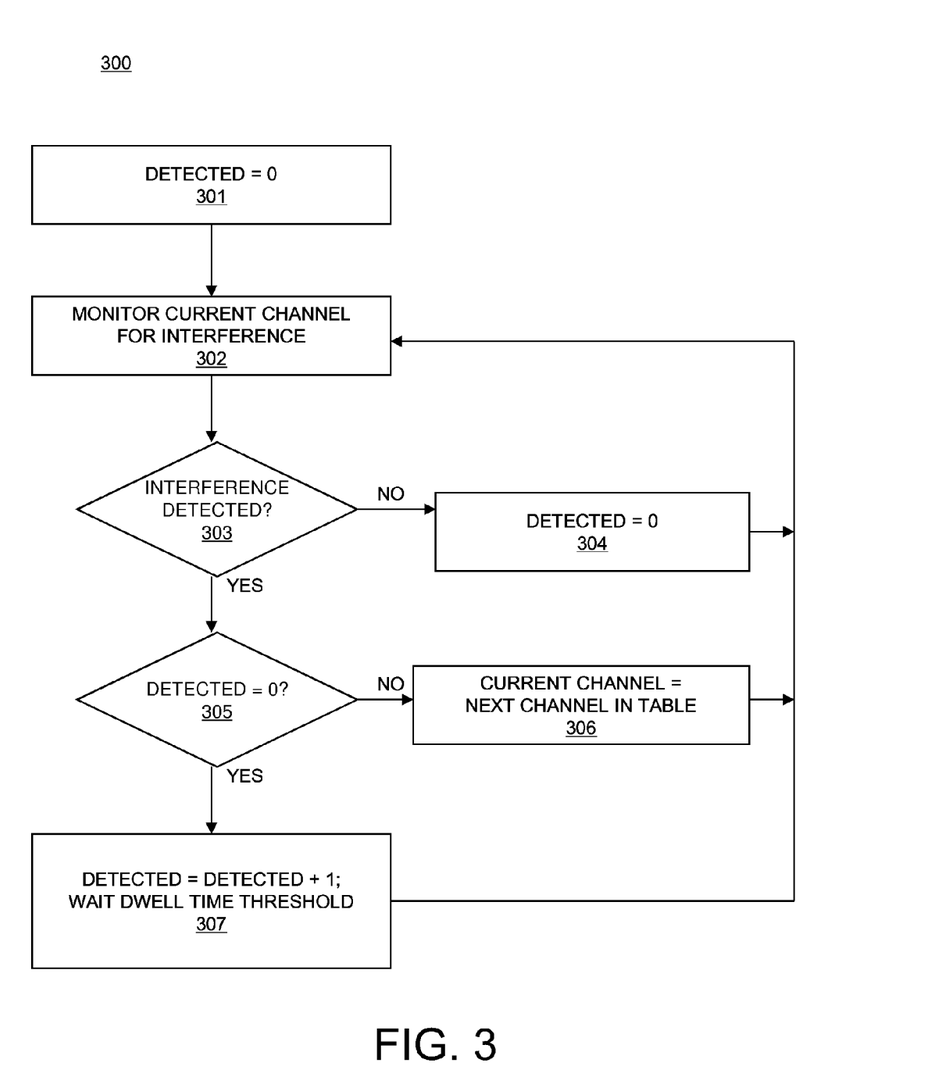
FIG. 3 illustrates an embodiment of a method for channel scanning implemented on a wireless access point.

During the operation of system 100, the WAPs 103a-b each continuously scan their respective current channel for interference from devices external to system 100 and from devices internal to system 100 that are not associated with the particular WAP. An embodiment of a channel scanning method 300 that may be implemented in a WAP (for example, WAPs 103a-b) is illustrated in FIG. 3. In block 301, a number of incidences of detected interference (hereinafter, detected) is set to zero. In block 302, the current channel is monitored for interference. In block 303, if interference is not detected on the current channel, flow proceeds to block 304, detected is set to zero, and flow proceeds back to block 302. If interference is detected on the current channel in block 303, flow proceeds to block 305, where it is determined if detected is equal to zero. If, in block 305, it is determined that detected is not equal to zero (i.e., dwell time of a detected interferer exceeds a pre-defined threshold), the WAP migrates to the next channel in its channel table in block 306, and flow proceeds back to block 302. If, in block 305, it is determined that detected is equal to zero, detected is incremented by 1 and the WAP waits for a period of time equal to a dwell time threshold in block 307, then flow proceeds back to block 302. The dwell time threshold may be defined such that the WAP will migrate to the next channel in the table only if the detected interference is detrimental to operation of the WAPs cluster, and not if the interference is fleeting. Alternatively, the WAP may also decide when to migrate to a new channel based on one or more of the following: the link quality of the last successfully received message from the WEPs, average number of retries performed for recent transmissions, success rate of recent transmissions, presence of messages from other WAPs on the current operating channel.

Figure 4:
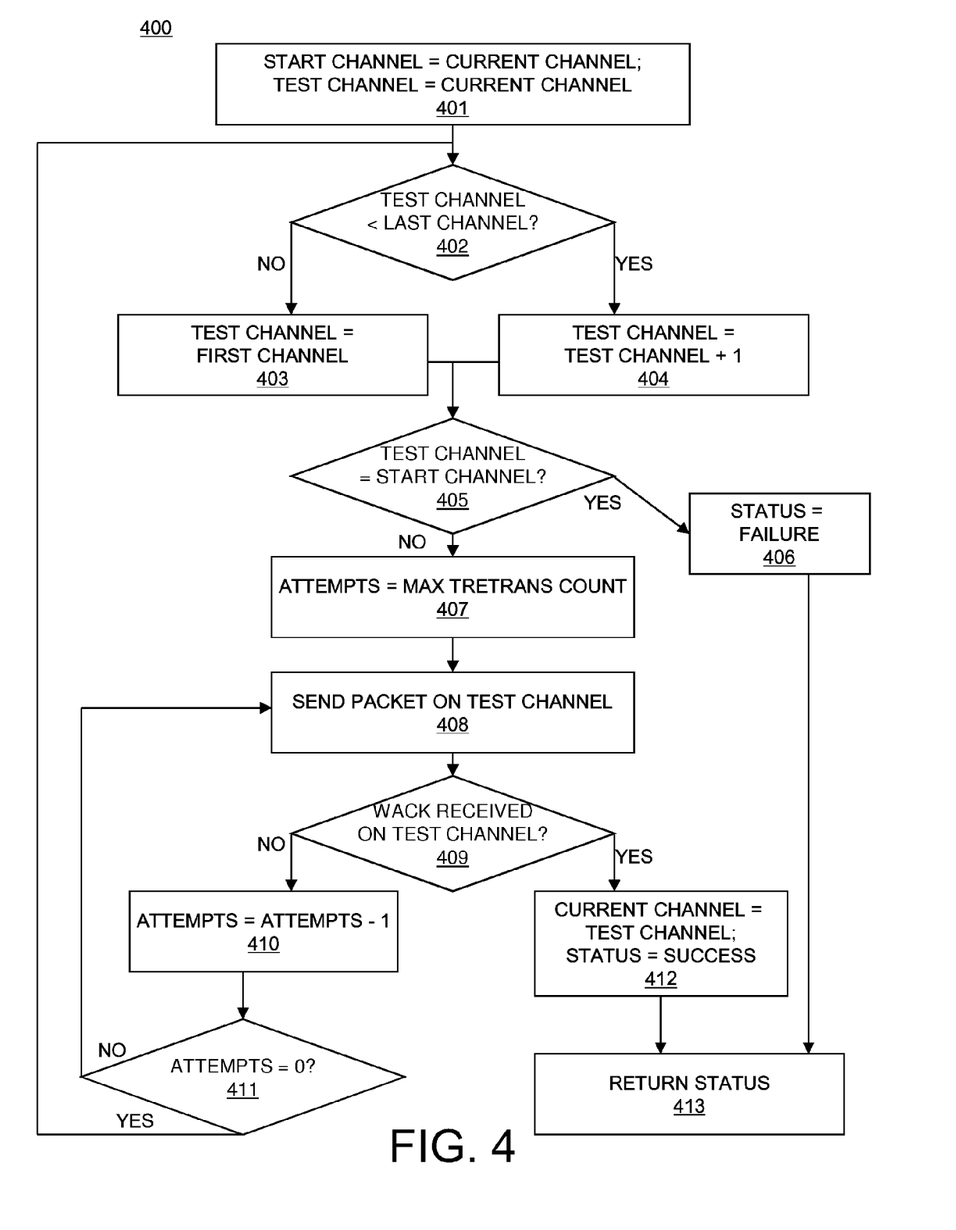
FIG. 4 illustrates an embodiment of a method for syncing with a wireless access point implemented on a wireless end point.

A WEP may sync up with the WAP only when a message needs to be transmitted from the WEP to the WAP, so as to conserve WEP battery life. In one embodiment, the WEPs each send a periodic heartbeat message to their associated WAP. If the heartbeat message is not acknowledged by the WAP and all retries for sending the heartbeat message are exhausted without any acknowledgement from the WAP, the WEP then performs a method of syncing with the WAP. A method 400 of syncing with a WAP that may be implemented in a WEP (for example, WEPs 101a-c or 102a-c) is illustrated in FIG. 4. In block 401, the start channel is set to the current channel, and the test channel is set to the current channel. In block 402, it is determined if the test channel is less than the last channel in the channel table. If it is determined that the test channel equal to the last channel in the channel table in block 402, flow proceeds to block 403. In block 403, the test channel is set to the first channel in the table, and flow proceeds to block 405. If it is determined that the test channel is less than the last channel in the channel table in block 402, flow proceeds to block 404, wherein the test channel is incremented to the next channel in the channel table, and flow proceeds to block 405. In block 405, it is determined if the test channel is equal to the start channel. If, in block 405, it is determined that the test channel is equal to the start channel, status is set to failure in block 406, and flow proceeds to block 413. If, in block 405, it is determined that the test channel is not equal to the start channel, flow proceeds to block 407. In block 407, a number of attempts is set to a maximum number of allowable retransmissions; then, in block 408, the WEP sends a packet on the test channel and waits for a response. If the WEP does not receive a response to the packet sent in block 408 from a WAP on the test channel in block 409, the number of attempts is decremented by 1 in block 510. Then, in block 411, it is determined if the number of attempts is equal to zero. If the number of attempts is determined to be equal to zero in block 411, flow proceeds back to block 402, and blocks 402-409 are repeated for the next channel in the channel table. If the number of attempts is determined to be greater than zero in block 411, flow proceeds back to block 408, and another packet is sent on the test channel in block 408. If the WEP does receive a response to the packet sent in block 408 from the WAP on the test channel in block 409, the current channel is set to the test channel (i.e., the WEP locks the test channel as the new current channel) and status is set to success. Then, in block 413, the status (success or failure) is returned.

The WEP may perform method 400 one or more times. In a preferred embodiment, the WEP may perform method 400 at least twice. This ensures that even if the WAP migrates to a different current channel after the WAP commences method 400, the WEP will be able to find the WAP's new current channel. Also, the WEP may not perform the sync method 400 for every transmission in some embodiments. The WEP may only search for the WAP's current channel every few heartbeats or during event transmissions in order to conserve battery life, as messages may get lost due to poor link quality and not because of WAP channel migration. The WEP may also decide when to perform the channel search method 400 based on one or more of the following: the link quality of the last successfully received message from the WAP, average number of retries performed for recent transmissions, success rate of recent transmissions, presence of messages from other WEPs, or presence of interference on the current operating channel. Channel migration time and battery usage are minimized in the WEPs by employing the channel table received from the WAP at cluster formation.

Figure 5:
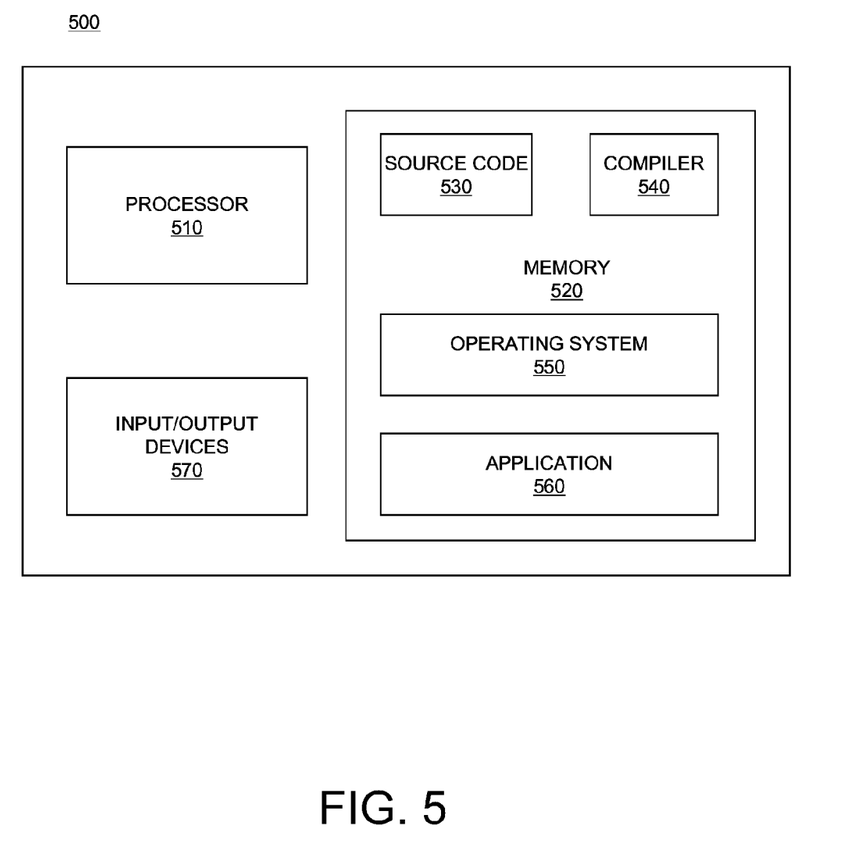
FIG. 5 illustrates an embodiment of a computer that may be used in conjunction with systems and methods for frequency agility in a wireless embedded system.

FIG. 5 illustrates an example of a computer 500 which may be utilized by exemplary embodiments of a method for frequency agility for a wireless embedded system as embodied in software. Various operations discussed above may utilize the capabilities of the computer 500. One or more of the capabilities of the computer 500 may be incorporated in any element, module, application, and/or component discussed herein, including the WAPs and WEPs.

The computer 500 includes, but is not limited to, embedded microprocessor based hardware modules, PCs, workstations, laptops, PDAs, palm devices, servers, storages, and the like. Generally, in terms of hardware architecture, the computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. The software may be a single source code that incorporates required applications without any O/S in some embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include reducing lost messages between a WAP and a WEP while conserving WEP battery life.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for frequency agility in a wireless embedded system, the wireless embedded system comprising a wireless access point (WAP) and a wireless end point (WEP) communicating on a current channel, the method comprising:

determining a first channel table comprising an order of available channels for the WAP;

determining a second channel table for WEP, wherein the first channel table and the second channel table list the available channels in the same order;

in the event interference is detected by the WAP on the current channel, determining a new current channel for the WAP by testing the available channels for interference in the order listed in the first channel table; and in the event the WEP does not receive an acknowledgement from the WAP of a message sent by the WEP to the WAP on the current channel, performing, by the WEP:
   setting a test channel equal to a next channel after the current channel for the WEP in the second channel table;
   sending a predetermined maximum number of packets on the test channel;
   based on not receiving by the WEP an acknowledgement of the sent packets on the test channel from the WAP, incrementing the test channel to a next channel in the second channel table; and
   repeating the sending and incrementing until the predetermined maximum number of packets have been sent on each channel in the second channel table;
wherein in the event interference is detected by the WAP on the current channel, determining a new current channel by testing the available channels for interference in the order listed in the first channel table comprises:
   the WAP monitoring the current channel for interference;
   in the event interference is detected on the current channel, the WAP determining if a number of incidences of detected interference is equal to zero;
   in the event the number of incidences of detected interference is equal to zero, the WAP incrementing the number of incidences of detected interference by one, waiting for a time period equal to a dwell time threshold, and continuing to monitor the current channel for interference; and
   in the event the number of incidences of detected interference is not equal to zero, the WAP changing the current channel to a next channel in the first channel table.

2. The method of claim 1, wherein determining the first channel table comprises scanning the available channels by the WAP, and ranking the scanned channels in order from a channel with the least interference to a channel with the most interference.

3. The method of claim 2, further comprising selecting the channel with the least interference as an initial current channel by the WAP.

4. The method of claim 3, further comprising:
   sending a join message by the WEP to the WAP;
   receiving a response to the join message by the WEP from the WAP on the initial current channel;
   locking by the WEP on the initial current channel; and
   sending the channel table by the WAP to the WEP, wherein the WEP uses the received first channel table as the second channel table.

5. A computer program product comprising a non-transitory computer readable storage medium containing computer code that, when executed by a computer, implements a method for frequency agility in a wireless embedded system, the wireless embedded system comprising a wireless access point (WAP) and a wireless end point (WEP) communicating on a current channel, wherein the method comprises:
   determining a first channel table comprising an order of available channels for the WAP;
   determining a second channel table for WEP, wherein the first channel table and the second channel table list the available channels in the same order;
   in the event interference is detected by the WAP on the current channel, determining a new current channel for the WAP by testing the available channels for interference in the order listed in the first channel table; and
   in the event the WEP does not receive an acknowledgement from the WAP of a message sent by the WEP to the WAP on the current channel, performing, by the WEP:
      setting a test channel equal to a next channel after the current channel for the WEP in the second channel table;
      sending a predetermined maximum number of packets on the test channel;
      based on not receiving by the WEP an acknowledgement of the sent packets on the test channel from the WAP, incrementing the test channel to a next channel in the second channel table; and
      repeating the sending and incrementing until the predetermined maximum number of packets have been sent on each channel in the second channel table,
   wherein in the event interference is detected by the WAP on the current channel, determining a new current channel by testing the available channels for interference in the order listed in the first channel table, comprises:
      the WAP monitoring the current channel for interference;
      in the event interference is detected on the current channel, the WAP determining if a number of incidences of detected interference is equal to zero;
      in the event the number of incidences of detected interference is equal to zero, the WAP incrementing the number of incidences of detected interference by one, waiting for a time period equal to a dwell time threshold, and continuing to monitor the current channel for interference; and
      in the event the number of incidences of detected interference is not equal to zero, the WAP changing the current channel to a next channel in the first channel table.

6. The computer program product according to claim 5, wherein determining the first channel table comprises scanning the available channels by the WAP, and ranking the scanned channels in order from a channel with the least interference to a channel with the most interference.

7. The computer program product according to claim 6, further comprising selecting the channel with the least interference as an initial current channel by the WAP.

8. The computer program product according to claim 7, further comprising:
   sending a join message by the WEP to the WAP;
   receiving a response to the join message by the WEP from the WAP on the initial current channel;
   locking by the WEP on the initial current channel; and
   sending the first channel table by the WAP to the WEP, wherein the WEP uses the received first channel table as the second channel table.

9. A wireless embedded system, comprising:
   a wireless access point (WAP) configured to determine a first channel table comprising an order of available channels;
   a wireless end point (WEP) configured to determine a second channel table, wherein the first channel table and the second channel table list the available channels in the same order;
   wherein the WAP is further configured to, in the event interference is detected by the WAP on a current channel, determine a new current channel for the WAP by testing the available channels for interference in the order listed in the first channel table; and
   wherein the WEP is further configured to, in the event the WEP does not receive an acknowledgement from the WAP of a message sent by the WEP to the WAP on the current channel:
      set a test channel equal to a next channel after the current channel for the WEP in the second channel table;
      send a predetermined maximum number of packets on the test channel;

based on not receiving by the WEP an acknowledgement of the sent packets on the test channel from the WAP, increment the test channel to a next channel in the second channel table; and repeat the sending and incrementing until the predetermined maximum number of packets have been sent on each channel in the second channel table;

wherein in the event interference is detected by the WAP on the current channel, determining a new current channel by testing the available channels for interference in the order listed in the first channel table, comprises:

the WAP monitoring the current channel for interference;

in the event interference is detected on the current channel, the WAP determining if a number of incidences of detected interference is equal to zero;

in the event the number of incidences of detected interference is equal to zero, the WAP incrementing the number of incidences of detected interference by one, waiting for a time period equal to a dwell time threshold, and continuing to monitor the current channel for interference; and in the event the number of incidences of detected interference is not equal to zero, the WAP changing the current channel to a next channel in the first channel table.

10. The wireless embedded system of claim 9, wherein determining the first channel table by the WAP comprises scanning the available channels by the WAP, and ranking the scanned channels in order from a channel with the least interference to a channel with the most interference.

11. The wireless embedded system of claim 10, wherein the WAP is further configured to select the channel with the least interference as an initial current channel.

12. The wireless embedded system of claim 11, wherein the WEP is further configured to:

send a join message to the WAP;

receive a response to the join message from the WAP on the initial current channel;

lock on the initial current channel; and receive the first channel table from the WAP on the initial current channel, wherein the WEP uses the received first channel table as the second channel table.

13. The method of claim 1, further comprising, based on receiving by the WEP an acknowledgement of a sent packet on the test channel from the WAP, determining that that test channel is a new current channel for the WEP.

14. The computer program product of claim 5, further comprising, based on receiving by the WEP an acknowledgement of a sent packet on the test channel from the WAP, determining that that test channel is a new current channel for the WEP.

15. The wireless embedded system of claim 9, further comprising, based on receiving by the WEP an acknowledgement of a sent packet on the test channel from the WAP, determining that that test channel is a new current channel for the WEP.

* * * * *